US008719040B2

(12) United States Patent
Tanaka et al.

(10) Patent No.: US 8,719,040 B2
(45) Date of Patent: May 6, 2014

(54) SIGNAL PROCESSING APPARATUS, SIGNAL PROCESSING METHOD, AND COMPUTER PROGRAM

(75) Inventors: Mitsunori Tanaka, Kanagawa (JP); Mamoru Tanaka, Chiba (JP); Makoto Mitsuno, Kanagawa (JP); Masashi Ohta, Tokyo (JP)

(73) Assignee: Sony Corporation (JP)

( * ) Notice: Subject to any disclaimer, the term of this patent is extended or adjusted under 35 U.S.C. 154(b) by 1545 days.

(21) Appl. No.: 11/904,023

(22) Filed: Sep. 25, 2007

(65) Prior Publication Data

US 2008/0086313 A1 Apr. 10, 2008

(30) Foreign Application Priority Data

Oct. 2, 2006 (JP) ................................ P2006-270928

(51) Int. Cl.

*G10L 19/00* (2013.01)
*H04B 1/00* (2006.01)
*H04N 9/80* (2006.01)
*H04B 1/66* (2006.01)

(52) U.S. Cl.

USPC .............. 704/500; 375/240; 381/86; 386/248

(58) Field of Classification Search

CPC ... G10L 19/00; G10L 19/0017; G10L 19/005; G10L 19/008; H04S 5/00; H04S 7/00; H04S 7/30; H03M 7/30

USPC .................................................. 704/500–504

See application file for complete search history.

(56) References Cited

U.S. PATENT DOCUMENTS 6,058,459 A * 5/2000 Owen et al. .................... 711/151
6,226,616 B1 * 5/2001 You et al. ........................ 704/500
6,256,487 B1 * 7/2001 Bruhn ............................. 455/352
6,324,515 B1 11/2001 Rabipour et al.
6,560,283 B1 * 5/2003 Fletcher ........................ 375/240.1

(Continued)

FOREIGN PATENT DOCUMENTS

EP 1724774 11/2006
JP 2005-020242 A 1/2005

(Continued)

OTHER PUBLICATIONS

Summons to attend oral proceedings pursuant to Rule 115(1) EPC, from Europea Application No. 07117686.1, dated Apr. 20, 2012.

*Primary Examiner* — Pierre-Louis Desir
*Assistant Examiner* — Matthew Baker
(74) *Attorney, Agent, or Firm* — Lerner, David, Littenberg, Krumholz & Mentlik, LLP

(57) ABSTRACT

A signal processing apparatus may include a decoder that decodes a compressed audio stream encoded by a predetermined codec, a signal processing unit that applies predetermined signal processing to an audio stream obtained by decoding the compressed audio stream with the decoder, a first acquisition unit that acquires at least one of information described in a header of the compressed audio stream and management information for contents including the compressed audio stream, a setting unit that discriminates, on the basis of the information, a type of the codec used for the encode of the compressed audio stream and sets a codec used for encode of the audio stream, and an encoder that encodes, in accordance with the setting by the setting unit, the audio stream subjected to the signal processing by the signal processing unit and outputs the audio stream to an external apparatus that has a decoder.

6 Claims, 8 Drawing Sheets

(56) References Cited

U.S. PATENT DOCUMENTS

| | | | | |
|---|---|---|---|---|
| 7,203,226 | B1 | 4/2007 | Rabipour et al. | |
| 7,266,501 | B2 * | 9/2007 | Saunders et al. | 704/500 |
| 7,272,567 | B2 * | 9/2007 | Fejzo | 704/500 |
| 7,283,965 | B1 * | 10/2007 | Michener | 704/500 |
| 7,512,986 | B2 * | 3/2009 | Shen-Orr et al. | 726/27 |
| 7,555,715 | B2 * | 6/2009 | Randall et al. | 715/249 |
| 7,801,732 | B2 * | 9/2010 | Park et al. | 704/500 |
| 7,949,930 | B2 * | 5/2011 | Yahata et al. | 714/776 |
| 8,175,167 | B2 * | 5/2012 | Bouton et al. | 375/240.26 |
| 8,189,665 | B2 * | 5/2012 | Morimoto et al. | 375/240.12 |
| 8,244,107 | B2 * | 8/2012 | Fukuda et al. | 386/326 |
| 8,285,116 | B2 * | 10/2012 | Morinaga | 386/248 |
| 2002/0002412 | A1 * | 1/2002 | Gunji et al. | 700/94 |
| 2002/0116199 | A1 * | 8/2002 | Wu et al. | 704/500 |
| 2002/0159755 | A1 * | 10/2002 | Kuroda | 386/94 |
| 2004/0045030 | A1 * | 3/2004 | Reynolds et al. | 725/110 |
| 2004/0151327 | A1 * | 8/2004 | Marlow | 381/86 |
| 2004/0204944 | A1 | 10/2004 | Castillo | |
| 2005/0234731 | A1 * | 10/2005 | Sirivara et al. | 704/500 |
| 2005/0273322 | A1 | 12/2005 | Lee | |
| 2006/0120466 | A1 * | 6/2006 | Yoshinari et al. | 375/259 |
| 2006/0179109 | A1 | 8/2006 | Ko | |
| 2006/0205362 | A1 | 9/2006 | Chang | |
| 2006/0248235 | A1 * | 11/2006 | Eyer | 710/1 |
| 2007/0206505 | A1 * | 9/2007 | Forbes | 370/252 |
| 2010/0117685 | A1 * | 5/2010 | Kong et al. | 327/74 |
| 2010/0122005 | A1 * | 5/2010 | Kong et al. | 710/260 |
| 2012/0069910 | A1 * | 3/2012 | Richardson et al. | 375/240.25 |
| 2012/0072225 | A1 * | 3/2012 | Richardson et al. | 704/500 |
| 2012/0275512 | A1 * | 11/2012 | Bouton et al. | 375/240.02 |

FOREIGN PATENT DOCUMENTS

| | | | |
|---|---|---|---|
| JP | 2006-011757 | A | 1/2006 |
| JP | 2006-165918 | A | 6/2006 |
| WO | 00/79520 | | 12/2000 |
| WO | 2005-050988 | A | 6/2005 |
| WO | 2005-098854 | A | 10/2005 |
| WO | 2006/061972 | A1 | 6/2006 |

* cited by examiner

SIGNAL PROCESSING APPARATUS, SIGNAL PROCESSING METHOD, AND COMPUTER PROGRAM

CROSS-REFERENCE TO RELATED APPLICATIONS

This application claims priority from Japanese Patent Application No. JP 2006-270928 filed in the Japanese Patent Office on Oct. 2, 2006, the entire content of which is incorporated herein by reference.

BACKGROUND OF THE INVENTION

1. Field of the Invention

The present invention relates to a signal processing apparatus, a signal processing method, and a computer program, and, more particularly to a signal processing apparatus, a signal processing method, and a computer program that make it possible to prevent, in applying signal processing to an inputted stream and outputting the stream, a mismatch between a type of a codec used for encode of the inputted stream and a type of a codec used for encode of the stream to be outputted.

2. Description of the Related Art

As one of functions realized by optical disks of a Blu-ray (registered trademark) Disc standard and the like, there is an interactive function. According to the interactive function, it is possible to popup-display operation menus over a video during the play of contents such as a movie. A user can perform various kinds of operations from the operation menus by, for example, operating a remote controller to move a cursor.

At timing when the cursor displayed on the operation menus is moved or when an item selected by the cursor is determined, audio (effect audio) corresponding to operation of the user is outputted together with audio of the movie being played. When audio is outputted by an external apparatus such as an AV amplifier connected to a player for the optical disk, such output of the audio of the contents combined with the other audio is performed by applying signal processing in the player to an audio stream read out from the optical disk and reproducing an audio stream obtained by the signal processing using the AV amplifier.

When the signal processing is applied to the audio stream read out from the optical disk, usually, the audio stream is encoded by a predetermined codec and recorded on the optical disk in a compressed state. Thus, in the player, the audio stream is once decoded and the signal processing is applied to the uncompressed audio stream obtained by the decode.

The audio stream subjected to the signal processing by the player is outputted in an uncompressed state as a stream of linear PCM (Pulse Code Modulation) or the like or re-encoded by an arbitrary codec and outputted in a compressed state. An audio stream that does not need to be subjected to the signal processing is outputted to the AV amplifier while kept in the compressed state as read out from the optical disk.

JP-A-2005-20242 discloses a technique for causing one player to play contents recorded on plural DVDs and allowing plural users to simultaneously view the different contents.

When the audio stream subjected to the signal processing is outputted from the player in the uncompressed state, the audio stream after decode has a large amount of information compared with the audio stream before decode and more bands are necessary for a transmission line between the player and the AV amplifier. Thus, the entire audio stream may not be able to be transmitted because of the lack of bands of the transmission line.

For example, in an S/PDIF I/F (IEC60958), which is one of digital audio I/Fs, an uncompressed audio stream of linear PCM for two channels can only be transmitted at the maximum.

Therefore, when an audio stream recorded on the optical disk is an audio stream of a multi-channel equal to or more than three channels, in order to transmit the audio stream subjected to the signal processing in the uncompressed state through the S/PDIF I/F, it is necessary to discard (not to transmit) a stream of a channel that may not be able to be transmitted or down-mix the audio stream to a stream of two channels for transmitting the stream.

In this case, unlike the case in which the audio stream recorded on the optical disk is directly outputted to the AV amplifier without being subjected to the signal processing, the user may be unable to effectively enjoy audio recorded in contents according to an intention of a producer.

When an audio stream subjected to the signal processing is re-encoded by an arbitrary codec and outputted in the compressed state, as far as the codec used in the re-encode is the arbitrary one, a mismatch of codecs may occur. In other words, audio stream encoded by a codec of a type different from that of a codec used for encode of the audio stream recorded on the optical disk may be outputted from the player.

For example, assuming that an audio stream encoded by a codec A is recorded on the optical disk and the audio stream is decoded and subjected to the signal processing, and, then re-encoded by a codec B and outputted, if the user selects an AV amplifier having a decoder applicable to only decode in the codec A as an apparatus connected to the player, an audio stream directly outputted from the player without being subjected to the signal processing can be reproduced but an audio stream re-encoded in the player may not be able to be reproduced.

Even when a type of a codec used for encode of an audio stream recorded on the optical disk and a type of a codec used in re-encode happen to be the same, when the re-encode is performed in accordance with parameters different from encode parameters used for the encode of the audio stream recorded on the optical disk, a substantial difference in audio effect or the like occurs between audio outputted by directly decoding the audio stream recorded on the optical disk and audio outputted by decoding the re-encoded audio stream. The encode parameters include, for example, information (channel assignment, ACMOD, and AMODE) related to the number of channels and a structure of a surround speaker.

For example, in the case that an audio stream recorded on the optical disk is an audio stream of a multi-channel of three channels, when the audio stream read out from the optical disk is directly outputted to the AV amplifier without being subjected to the signal processing, the AV amplifier regards the audio stream supplied thereto as an audio signal of three channels and applies surround processing to the audio stream to drive a speaker.

On the other hand, when encode parameters are set so as to encode the audio stream recorded on the optical disk as an audio stream of 5.1 channels different from the number of channels of the audio stream recorded on the optical disk and the audio stream subjected the signal processing is re-encoded, regardless of the fact that the audio stream as a basis of the re-encode is only of three channels, the audio stream is outputted as an audio stream of 5.1 channels from the player. The AV amplifier that receives the audio stream applies, considering that the audio stream of 5.1 channels is supplied, the surround processing to the audio stream to drive the speaker. In other words, the AV amplifier processes the audio stream for 2.1 channels as a silent signal is supplied thereto.

In the former case and the latter case, different kinds of processings are performed by the AV amplifier. Thus, even if the original audio stream is the same, as a result of the processings, audio to be outputted and audio effect are substantially affected.

When the transmission line and the AV amplifier are selected assuming that an audio stream read out from the optical disk is always directly outputted from the player (while keeping the compressed state) without being subjected to the signal processing, the situation described above may occur.

SUMMARY OF THE INVENTION

Therefore, it is desirable to make it possible to prevent, for example, when inputted stream is subjected to signal processing and outputted, a mismatch between a codec used for encode of the inputted stream and a codec used for encoding a stream to be outputted.

According to an embodiment of the present invention, there is provided a signal processing apparatus which may include a decoder that decodes a compressed audio stream encoded by a predetermined codec, a signal processing unit that applies predetermined signal processing to an audio stream obtained by decoding the compressed audio stream with the decoder, a first acquisition unit that acquires at least one of information described in a header of the compressed audio stream and management information for contents including the compressed audio stream, a setting unit that discriminates, on the basis of the information acquired by the first acquisition unit, a type of the codec used for the encode of the compressed audio stream and sets a codec used for encode of the audio stream subjected to the signal processing by the signal processing unit, and an encoder that encodes, in accordance with the setting by the setting unit, the audio stream subjected to the signal processing by the signal processing unit and outputs the audio stream to an external apparatus that has a decoder.

It is possible to cause the signal processing unit to apply signal processing for changing an audio stream to a stream, in which audio combined with other audio is outputted, to the audio stream obtained by decoding the compressed audio stream with the decoder.

It is possible to cause the setting unit to set the encoder such that the encode of the audio stream subjected to the signal processing by the signal processing unit is performed by a codec of a type same as that of the codec used for the encode of the compressed audio stream.

It is possible to cause the setting unit to set, when the encoder is not applicable to encode in the codec of the type same as that of the codec used for the encode of the compressed audio stream, the encoder such that the encode of the audio stream subjected to the signal processing by the signal processing unit is performed by a compatible codec, which is a higher-order codec obtained by extending a function of the codec used for the encode of the compressed audio stream or a lower-order codec obtained by reducing the function.

It is possible to further provide a second acquisition unit that acquires information on the external apparatus. In this case, it is possible to cause the setting unit to set the encoder such that the encode of the audio stream subjected to the signal processing by the signal processing unit is performed by a codec of a type same as that of the codec used for the encode of the compressed audio stream, and a codec of a type same as that of a codec which is indicated by the information acquired by the second acquisition unit and in which the decoder of the external apparatus is applicable to the decode.

It is possible to cause the setting unit to set, when the encoder is not applicable to the encode in the codec of the type same as that of the codec used for the encode of the compressed audio stream, the encoder such that the encode of the audio stream subjected to the signal processing by the signal processing unit is performed by a compatible codec, which is a higher-order codec obtained by extending a function of the codec used for the encode of the compressed audio stream or a lower-order codec obtained by reducing the function.

It is possible to cause the setting unit to further set, when the encoder is not applicable to the encode in the compatible codec, the encoder such that the encode of the audio stream subjected to the signal processing by the signal processing unit is performed by a codec of a type same as a codec which is indicated by the information acquired by the second acquisition unit and, in which the decoder of the external apparatus is applicable to the decode.

It is possible to cause the first acquisition unit to further acquire parameters used for the encode of the compressed audio stream and cause the setting unit to set the encoder such that the encode of the audio stream subjected to the signal processing by the signal processing unit is performed in accordance with parameters same as the parameters acquired by the first acquisition unit.

According to another embodiment of the present invention, there is provided a signal processing method which may include decoding a compressed audio stream encoded by a predetermined codec, applying predetermined signal processing to an audio stream obtained by decoding the compressed audio stream, acquiring at least one of information described in a header of the compressed audio stream and management information for contents including the compressed audio stream, discriminating, on the basis of the acquired information, a type of the codec used for the encode of the compressed audio stream and setting a codec used for encode of the audio stream subjected to the signal processing, and encoding, in accordance with the setting, the audio stream subjected to the signal processing and outputting the audio stream to an external apparatus that has a decoder.

It is possible to set the encoder such that the encode of the audio stream subjected to the signal processing is performed by a codec of a type same as that of the codec used for the encode of the compressed audio stream.

According to still another embodiment of the present invention, there is provided a computer program for causing a computer to execute processing which may include decoding a compressed audio stream encoded by a predetermined codec, applying predetermined signal processing to an audio stream obtained by decoding the compressed audio stream, acquiring at least one of information described in a header of the compressed audio stream and management information for contents including the compressed audio stream, discriminating, on the basis of the acquired information, a type of the codec used for the encode of the compressed audio stream and setting a codec used for encode of the audio stream subjected to the signal processing, and encoding, in accordance with the setting, the audio stream subjected to the signal processing and outputting the audio stream to an external apparatus that has a decoder.

It is possible to set the encoder such that the encode of the audio stream subjected to the signal processing is performed by a codec of a type same as that of the codec used for the encode of the compressed audio stream.

According to an embodiment of the present invention, a compressed audio stream encoded by a predetermined codec may be decoded and predetermined signal processing may be applied to an audio stream obtained by decoding the compressed audio stream. At least one of information described in a header of the compressed audio stream and management information for contents including the compressed audio stream may be acquired. A type of the codec used for the encode of the compressed audio stream may be discriminated on the basis of the acquired information. A codec used for encode of the audio stream subjected to the signal processing may be set. The audio stream subjected to the signal processing may be encoded in accordance with the setting and outputted to an external apparatus that has a decoder.

According to the embodiment of the present invention, for example, when an inputted stream is subjected to signal processing and outputted, it is possible to prevent a mismatch of a codec used for encode of the inputted stream and a codec used for encode of a stream to be outputted.

DETAILED DESCRIPTION

Embodiments of the present invention will be hereinafter explained. A correspondence relation between elements of the present invention and the embodiments described or shown in the specification or the drawings is described as follows. This description is for confirming that the embodiments supporting the present invention are described or shown in the specification or the drawings. Therefore, even if there is an embodiment that is described or shown in the specification or the drawings but is not described herein as an embodiment corresponding to an element of the present invention, this does not means that the embodiment does not correspond to the element. Conversely, even if an embodiment is described herein as an embodiment corresponding to an element of the present invention, this does not means that the embodiment does not correspond to elements other than the element.

Figure 3:
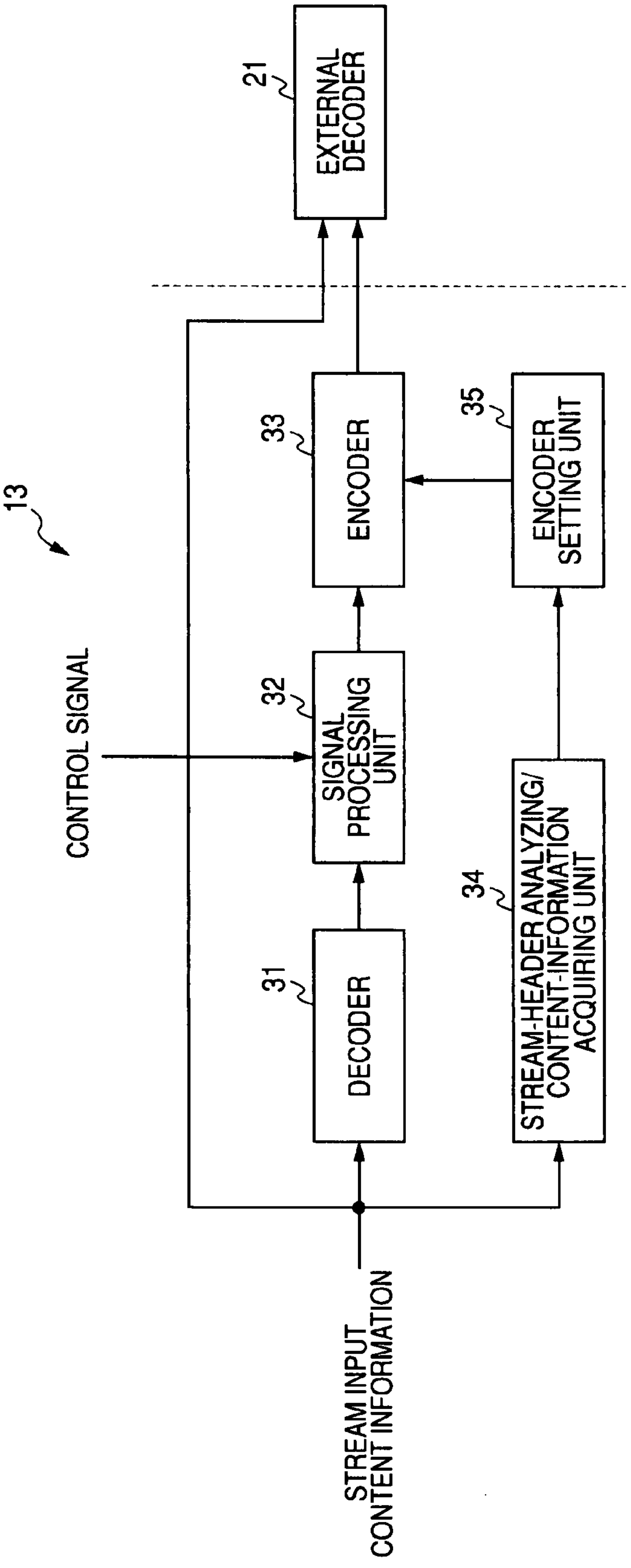
FIG. 3 is a block diagram showing an example of a structure of an audio-signal processing unit in FIG. 2.

A signal processing apparatus (e.g., a player 1 in FIG. 1) according to an embodiment of the present invention includes a decoder (e.g., a decoder 31 in FIG. 3) that decodes a compressed audio stream encoded by a predetermined codec, a signal processing unit (e.g., a signal processing unit 32 in FIG. 3) that applies predetermined signal processing to an audio stream obtained by decoding the compressed audio stream with the decoder, a first acquisition unit (e.g., a stream-header analyzing/content-information acquiring unit 34 in FIG. 3) that acquires at least one of information described in a header of the compressed audio stream and management information for contents including the compressed audio stream, a setting unit (e.g., an encoder setting unit 35 in FIG. 3) that discriminates, on the basis of the information acquired by the first acquisition unit, a type of the codec used for the encode of the compressed audio stream and sets a codec used for encode of the audio stream subjected to the signal processing by the signal processing unit, and an encoder (e.g., an encoder 33 in FIG. 3) that encodes, in accordance with the setting by the setting unit, the audio stream subjected to the signal processing by the signal processing unit and outputs the audio stream to an external apparatus that has a decoder.

Figure 6:
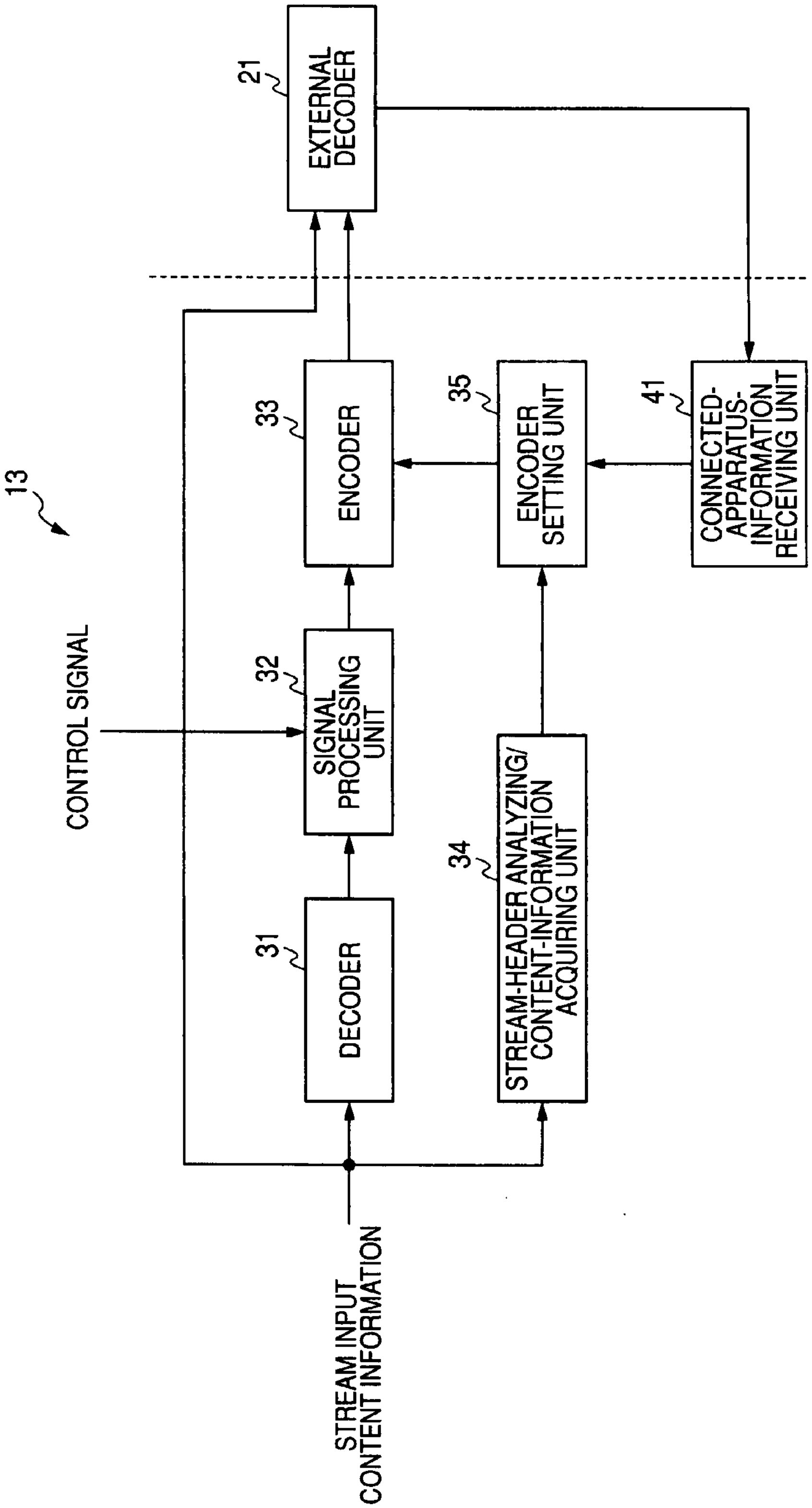
FIG. 6 is a block diagram showing another example of the structure of the audio-signal processing unit in FIG. 2.

It is possible for the signal processing apparatus to further include a second acquisition unit (e.g., a connected-apparatus-information receiving unit 41 in FIG. 6) that acquires information on the external apparatus.

Figure 4:
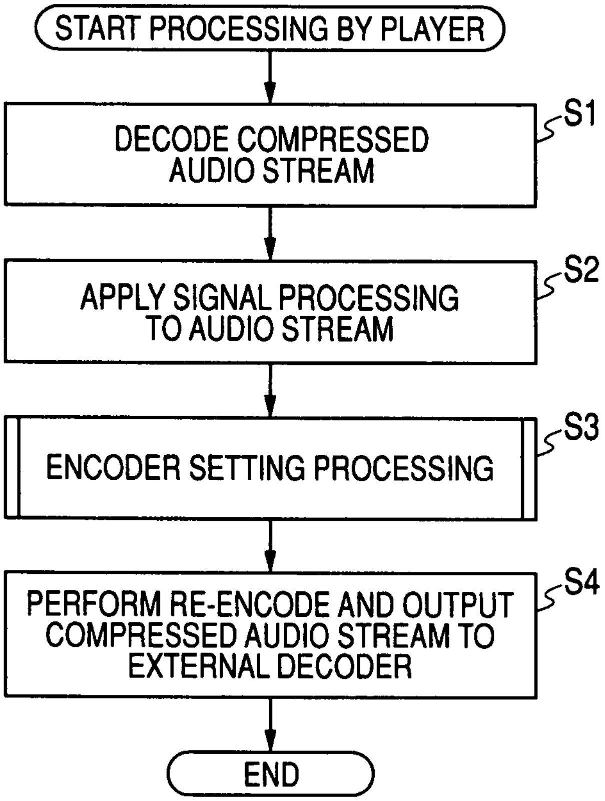
FIG. 4 is a flowchart for explaining processing by the player for applying signal processing to an audio stream.

A signal processing method according to another embodiment of the present invention includes the steps of decoding a compressed audio stream encoded by a predetermined codec, applying predetermined signal processing to an audio stream obtained by decoding the compressed audio stream, acquiring at least one of information described in a header of the compressed audio stream and management information for contents including the compressed audio stream, discriminating, on the basis of the acquired information, a type of the codec used for the encode of the compressed audio stream and setting a codec used for encode of the audio stream subjected to the signal processing, and encoding, in accordance with the setting, the audio stream subjected to the signal processing and outputting the audio stream to an external apparatus that has a decoder (e.g., step S4 in FIG. 4).

A computer program according to still another embodiment of the present invention causes a computer to execute processing including the steps of decoding a compressed audio stream encoded by a predetermined codec, applying predetermined signal processing to an audio stream obtained by decoding the compressed audio stream, acquiring at least one of information described in a header of the compressed audio stream and management information for contents including the compressed audio stream, discriminating, on the basis of the acquired information, a type of the codec used for the encode of the compressed audio stream and setting a codec used for encode of the audio stream subjected to the signal processing, and encoding, in accordance with the setting, the audio stream subjected to the signal processing and outputting the audio stream to an external apparatus that has a decoder (e.g., step S4 in FIG. 4).

The embodiments of the present invention will be hereinafter explained with reference to the accompanying drawings.

Figure 1:
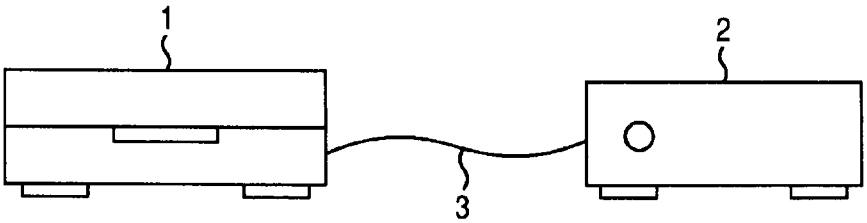
FIG. 1 is a diagram showing an example of a structure of a transmission system according to an embodiment of the present invention.

FIG. 1 is a diagram showing an example of a structure of a transmission system according to an embodiment of the present invention.

The transmission system in FIG. 1 is constituted by connecting a player 1 and an external apparatus 2 via a cable 3.

The player 1 is an apparatus that plays an optical disk of a predetermined standard such as a BD (Blu-ray Disc) standard or an HD-DVD (registered trademark) standard. When contents such as movies are recorded on an optical disk inserted in the player 1, the player 1 outputs an audio stream read out from the optical disk to the external apparatus 2 via the cable 3 and causes the external apparatus 2 to perform output of audio. The external apparatus 2 includes a decoder. The audio stream supplied from the player 1 is decoded by the decoder and audio of the contents is outputted from a speaker connected to the external apparatus 2.

The player 1 decodes a video stream read out from the optical disk, outputs a video signal obtained by decoding the video stream to a not-shown TV directly or via the external apparatus 2, and causes the TV to display the video. Processing performed by the player 1 using the audio stream and a structure of the player that performs the processing are mainly explained below. However, processing of the video stream is also performed as appropriate in the player 1.

An audio stream is recorded on the optical disk in a compressed state. Basically, a compressed audio stream read out from the optical disk is directly outputted from the player 1 to the external apparatus 2. The audio stream is encoded by a predetermined codec such as Dolby digital, Dolby digital plus, Dolby lossless (TrueHD), DTS, or DTS-HD (all of which are trademarks) and recorded on the optical disk.

The player 1 also has an interactive function that makes it possible to popup-display operation menus over a video of contents during the play of the contents and allows a user to perform various kinds of operations from the operation menus. For example, when the user moves a cursor on the operation menus displayed over the video of the contents by operating a remote controller or the like or when the user determines an item selected by the cursor by operating the remote controller or the like, audio corresponding to the operation by the user is outputted together with the audio of the contents being played.

When the other audio is outputted together with the audio of the contents, in the player 1, the compressed audio stream read out from the optical disk is decoded once and signal processing is applied to an uncompressed audio stream obtained by decoding the compressed audio stream. The signal processing is processing for generating an audio stream in which the audio corresponding to the operation by the user is outputted together with the audio of the contents.

In the player 1, the audio stream obtained by applying the signal processing to the uncompressed audio stream is re-encoded by a predetermined codec and a compressed audio stream obtained by re-encoding the audio stream is outputted to the external apparatus 2. A type of the codec used in this re-encode is selected on the basis of information described in a header of the compressed audio stream read out from the optical disk, management information for contents, and the like.

For example, when an encoder that performs the re-encode is applicable to encode in a codec of a type same as that of the codec used for the encode of the compressed audio stream recorded on the optical disk, the codec of the type same as that of the codec used for the encode of the compressed audio stream recorded on the optical disk is selected as the codec used for the re-encode.

This makes it possible to match a type of the codec used for the encode of the compressed audio stream recorded on the optical disk and a type of the codec used for the encode (the re-encode) of the compressed audio stream outputted from the player 1 after the re-encode is performed. Thus, it is possible to prevent a mismatch from occurring between a type of a codec described in a package of an optical disk purchased by a user and a type of a codec for the compressed audio stream actually outputted from the player 1.

As described above, when the signal processing is not applied, the compressed audio stream read out from the optical disk is directly outputted to the external apparatus 2. Thus, when a type of the codec used for re-encode is different from a type of a codec used for the encode of the compressed audio stream recorded on the optical disk, compressed audio streams encoded by the codecs of the different types are outputted from the player 1 when the signal processing is applied and when the signal processing is not applied.

In the case that the user prepares, according to the codec used for the encode of the compressed audio stream recorded on the optical disk, an AV amplifier applicable to decode of a codec same as the codec as the external apparatus 2, only when a compressed audio stream re-encoded by a codec of a type different from that of the codec used for the encode of the compressed audio stream recorded on the optical disk is outputted from the player 1, the external apparatus 2 cannot decode the compressed audio stream and audio is not outputted. However, it is possible to prevent such a problem.

Figure 2:
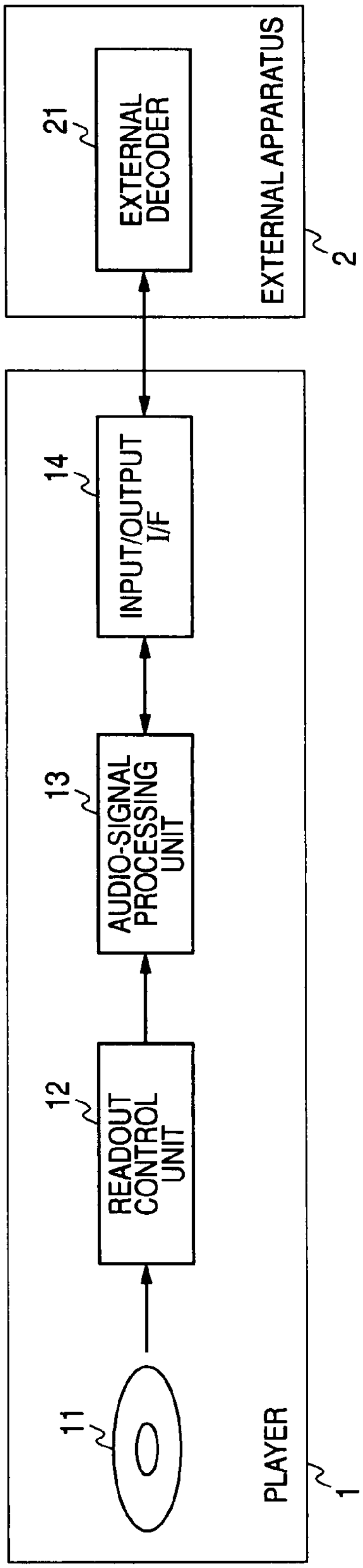
FIG. 2 is a block diagram showing an example of a structure of a player and an external apparatus.

FIG. 2 is a block diagram showing an example of a structure of the player 1 and the external apparatus 2.

As shown in FIG. 2, as components for processing an audio stream, the player 1 includes a readout control unit 12, an audio-signal processing unit 13, and an input/output I/F 14. The external apparatus 2 includes an external decoder 21.

The readout control unit 12 of the player 1 reads out a compressed audio stream recorded on an optical disk 11 inserted in the player 1 and outputs the read-out compressed audio stream to the audio-signal processing unit 13. Information representing a type of a codec used for encode, the number of channels, a sampling rate, and the like is described in a header of the compressed audio stream outputted to the audio-signal processing unit 13.

The readout control unit 12 reads out, when contents information for managing entire contents is recorded on the optical disk 11, the content information from the optical disk 11 and outputs the read-out content information to the audio-signal processing unit 13. The content information includes information on a video such as a type of a codec used for encode of a video stream, information on audio such as a type of a codec used for encode of a compressed audio stream, the number of channels, and a sampling rate, and information for restricting copying.

When it is unnecessary to apply the signal processing, the audio-signal processing unit 13 directly outputs the compressed audio stream, which is supplied from the readout control unit 12, to the input/output I/F 14.

On the other hand, when it is necessary to apply the signal processing in order to cause the external apparatus 2 to output audio corresponding to operation by the user together with audio of contents, the audio-signal processing unit 13 decodes the compressed audio stream supplied from the readout control unit 12 and applies the signal processing to an uncompressed audio stream obtained by decoding the compressed audio stream.

The audio-signal processing unit 13 discriminates, on the basis of the information described in the header of the compressed audio stream and the content information, a type of a codec used for the encode of the compressed audio stream recorded on the optical disk 11 and re-encodes, using, for example, a codec of a type same as the discriminated type, an audio stream obtained by applying the signal processing to the uncompressed audio stream. The audio-signal processing unit 13 outputs a compressed audio stream obtained by re-encoding the audio stream to the input/output I/F 14.

The input/output I/F 14 transmits the compressed audio stream not subjected to the signal processing or the compressed audio stream subjected to the signal processing and obtained by re-encoding the audio stream, which is supplied from the audio-signal processing unit, to the external apparatus 2. The transmission of the compressed audio stream to the external apparatus 2 is performed through an interface such as an S/PDIF I/F, an HDMI (High-Definition Multimedia Interface), or an IEEE (Institute of Electrical and Electronics Engineers) 1394.

When the player 1 and the external apparatus 2 are connected by an interface of the HDMI standard or the IEEE1394 standard, as described later, acquisition of information on the external apparatus 2 from the external apparatus 2 is also performed by the input/output I/F 14. The information acquired by the input/output I/F 14 is outputted to the audio-signal processing unit 13.

The external decoder 21 of the external apparatus 2 decodes the compressed audio stream transmitted from the player 1 and causes the external apparatus 2 to output audio from a speaker connected to the external apparatus 2 on the basis of an audio signal obtained by decoding the compressed audio stream.

FIG. 3 is a block diagram showing an example of a structure of the audio-signal processing unit 13 in FIG. 2.

Respective components shown in FIG. 3 are realized in terms of hardware or in terms of software according to the execution of a predetermined program by a CPU (Central Processing Unit) provided in the player 1. The external decoder 21 of the external apparatus 2 is also shown in FIG. 3.

As shown in FIG. 3, the audio-signal processing unit 13 includes a decoder 31, a signal processing unit 32, an encoder 33, a stream-header analyzing/content-information acquiring unit 34, and an encoder setting unit 35.

The compressed audio stream read out from the optical disk 11 and outputted from the readout control unit 12 is directly supplied to the external decoder 21 through the input/output I/F 14 when it is unnecessary to apply the signal processing to the compressed audio stream. When it is necessary to apply the signal processing to the compressed audio stream, the audio stream is supplied to the decoder 31 and the stream-header analyzing/content-information acquiring unit 34 of the audio-signal processing unit 13.

The decoder 31 decodes the compressed audio stream supplied from the readout control unit 12 and outputs an uncompressed audio stream of linear PCM or the like obtained by decoding the compressed audio stream to the signal processing unit 32.

The signal processing unit 32 applies, on the basis of a control signal supplied from the outside, to the audio stream supplied from the decoder 31 such that, for example, audio corresponding to operation by the user is outputted together with audio of contents. Details of the signal processing are designated by the control signal supplied from the outside. The signal processing unit 32 outputs an uncompressed audio stream obtained by applying the signal processing to the audio stream to the encoder 31.

The encoder 33 re-encodes, in accordance with setting by the encoder setting unit 35, the uncompressed audio stream supplied from the signal processing unit 32 and outputs a compressed audio stream obtained by re-encoding the uncompressed audio stream to the external decoder 21 through the input/output I/F 14.

When encode parameters are set by the encoder setting unit 35, the encoder 33 performs the re-encode in accordance with the encode parameters as well. For example, when the information such as the number of channels and the sampling rate set during the encode of the compressed audio stream recorded on the optical disk 11 is acquired from the information described in the header of the compressed audio stream and the information is set as the encode parameters, the encoder 33 re-encodes the audio stream supplied from the signal processing unit 32 such that an audio stream of the same number of channels and the same sampling rate is obtained.

The stream-header analyzing/content-information acquiring unit 34 acquires the information described in the header of the compressed audio stream and the content information supplied from the readout control unit 12 and outputs the acquired information to the encoder setting unit 35.

When the stream-header analyzing/content-information acquiring unit 34 acquires the encode parameters from the information described in the header of the compressed audio stream and the content information, the stream-header analyzing/content-information acquiring unit 34 outputs the acquired encode parameters to the encoder setting unit 35.

The encoder setting unit 35 discriminates, on the basis of the information supplied from the stream-header analyzing/content-information acquiring unit 34, a type of the codec used for the encode of the compressed audio stream recorded on the optical disk 11. The encoder setting unit 35 sets the encoder 33 such that re-encode is performed using a codec of a type same as the discriminated type, i.e., a codec of a type same as that of the codec used for the encode of the compressed audio stream recorded on the optical disk 11.

When the encoder 33 is not applicable to the encode in the codec of the type same as that of the codec used for the encode of the compressed audio stream recorded on the optical disk 11, the encoder setting unit 35 sets the encoder 33 such that re-encode is performed using a compatible codec, which is a codec highly compatible with the codec.

When there are a higher-order codec obtained by extending a function of a certain codec and a lower-order codec obtained by reducing the function of the codec, the codecs are compatible codecs. Specifically, since codecs of Dolby digital, Dolby digital plus, and Dolby lossless (TrueHD) are codecs in a hierarchical relation, the codecs are compatible codecs. Since codecs of DTS and DTS-HD are codecs in a hierarchical relation, the codecs are compatible codecs.

For example, suppose that the codec used for the encode of the compressed audio stream recorded on the optical disk 11 is a codec of Dolby digital plus and the encoder 33 is applicable only to encode in a codec of Dolby digital, which is a lower-order codec of the codec of Dolby digital plus. In this case, if the external decoder 21 can decode the compressed audio stream encoded by the codec of Dolby digital plus, it is considered that the external decoder 21 can also decode a compressed audio stream encoded by the codec of Dolby digital, which is a codec lower in order than the codec of the Dolby digital plus. Thus, the encoder 33 is set such that re-encode is performed by the codec of Dolby digital, which is the compatible codec.

The compressed audio stream encoded by the codec of Dolby digital plus is outputted at normal time when the signal processing is not applied. Thus, in this case, a compressed audio stream re-encoded by a codec of a type different from that of the codec used for the encode of the compressed audio stream recorded on the optical disk 11 is outputted from the player 1. However, it is possible to output audio corresponding to operation of the user together with audio of contents.

When the encoder 33 is not applicable to the encode in the codec highly compatible with the codec used for the encode of the compressed audio stream recorded on the optical disk 11, the encoder setting unit 35 sets the encoder 33 such that the audio stream is outputted without being subjected to re-encode. In this case, an uncompressed audio stream of linear PCM or the like obtained by applying the signal processing to the audio stream by the signal processing unit 32 is directly outputted to the external decoder 21.

Processing by the player 1 having the structure described above is explained below.

First, processing by the player 1 for applying signal processing to an audio stream is explained with reference to a flowchart in FIG. 4. This processing is started when a compressed audio stream as an object of the signal processing is supplied from the readout control unit 12 to the audio-signal processing unit 13.

In step S1, the decoder 31 decodes the compressed audio stream supplied from the readout control unit 12 and outputs an uncompressed audio stream of liner PCM or the like obtained by decoding the compressed audio stream to the signal processing unit 32.

In step S2, the signal processing unit 32 applies the signal processing to the uncompressed audio stream supplied from the decoder 31. The signal processing unit 32 outputs the uncompressed audio stream subjected to the signal processing to the encoder 33.

In step S3, encoder setting processing is performed. A type and the like of a codec used in re-encode are set by the encoder setting processing. Details of the encoder setting processing are described later with reference to a flowchart in FIG. 5.

In step S4, the encoder 33 re-encodes the uncompressed audio stream supplied from the signal processing unit 32 in accordance with the setting by the encoder setting unit 35. The encoder 33 outputs a compressed audio stream obtained by re-encoding the uncompressed audio stream to the external decoder 21 through the input/output I/F 14 and finishes the processing. The external decoder 21 decodes the compressed audio stream supplied from the player 1 and outputs audio corresponding to operation by the user together with audio of contents.

The encoder setting processing performed in step S3 in FIG. 4 is explained below with reference to a flowchart in FIG. 5.

In step S11, the stream-header analyzing/content-information acquiring unit 34 acquires information described in a header of the compressed audio stream supplied from the readout control unit 12 and content information and outputs the acquired information to the encoder setting unit 35. Any one of the information described in the header of the compressed audio stream and the content information may be acquired.

In step S12, the encoder setting unit 35 discriminates, on the basis of the information supplied from the stream-header analyzing/content-information acquiring unit 34, a type of a codec used for encode of the compressed audio stream recorded on the optical disk 11.

In step S13, the encoder setting unit 35 judges whether the encoder 33 is applicable to encode in a codec of a type same as that of the codec used for the encode of the compressed audio stream recorded on the optical disk 11. When the encoder 33 is judged to be applicable to the encode, the processing proceeds to step S14.

In step S14, the encoder setting unit 35 sets the encoder 33 such that re-encode is performed using the codec of the type same as that of the codec used for the encode of the compressed audio stream recorded on the optical disk 11. Thereafter, the processing returns to step S3 in FIG. 4 and re-encode of the audio stream is performed using the codec of the type same as that of the codec used for the encode of the compressed audio stream recorded on the optical disk 11.

On the other hand, when the encoder setting unit 35 judges in step S13 that the encoder 33 is not applicable to the encode in the codec of the type same as that of the codec used for the encode of the compressed audio stream recorded on the optical disk 11, the processing proceeds to step S15. The encoder setting unit 35 judges whether the encoder 33 is applicable to encode in a compatible codec, which is a codec highly compatible with the codec.

When the encoder setting unit 35 judges in step S15 that the encoder 33 is applicable to the encode in the compatible codec, the processing proceeds to step S16. The encoder setting unit 35 sets the encoder 33 such that re-encode is performed in the compatible codec. Thereafter, the processing returns to step S3 in FIG. 4 and re-encode of the audio stream is performed using the compatible codec.

On the other hand, when the encoder setting unit 35 judges in step S15 that the encoder 33 is neither applicable to the encode in the compatible codec, the processing proceeds to step S17. The encoder setting unit 35 sets the encoder 33 such that the audio stream is outputted without being re-encoded. Thereafter, an audio stream of linear PCM or the like obtained by performing the signal processing is outputted to the external decoder 21 while kept in an uncompressed state. In this case, the processing in step S4 in FIG. 4 for re-encoding the audio stream is not performed and the processing in FIG. 4 is finished.

According to the processing described above, when the encoder 33 is applicable to the encode in the codec of the type same as that of the codec used for the encode of the compressed audio stream recorded on the optical disk 11, the audio stream obtained by performing the signal processing is re-encoded by the codec and then outputted to the external apparatus 2. Thus, even when the signal processing is performed, it is possible to prevent a compressed audio stream re-encoded by a codec of a type different from that of the codec used for the encode of the compressed audio stream recorded on the optical disk 11 from being outputted from the player 1.

For example, when the optical disk 11 is a disk of a BD-ROM standard, compressed audio streams encoded by various codecs of Dolby digital, Dolby digital plus, Dolby lossless, DTS, and DTS-HD are recorded on the optical disk 11. If the encoder 33 is applicable to encode by the codecs of Dolby digital and DTS, when a compressed audio stream encoded by the codec of Dolby digital is read out from the optical disk 11 and subjected to the signal processing, an audio stream obtained by the signal processing is re-encoded by the codec of Dolby digital and outputted.

When a compressed audio stream encoded by the codec of DTS is read out from the optical disk 11 and subjected to the signal processing, an audio stream obtained by the signal processing is re-encoded by the encoder of DTS and outputted.

Figure 5:
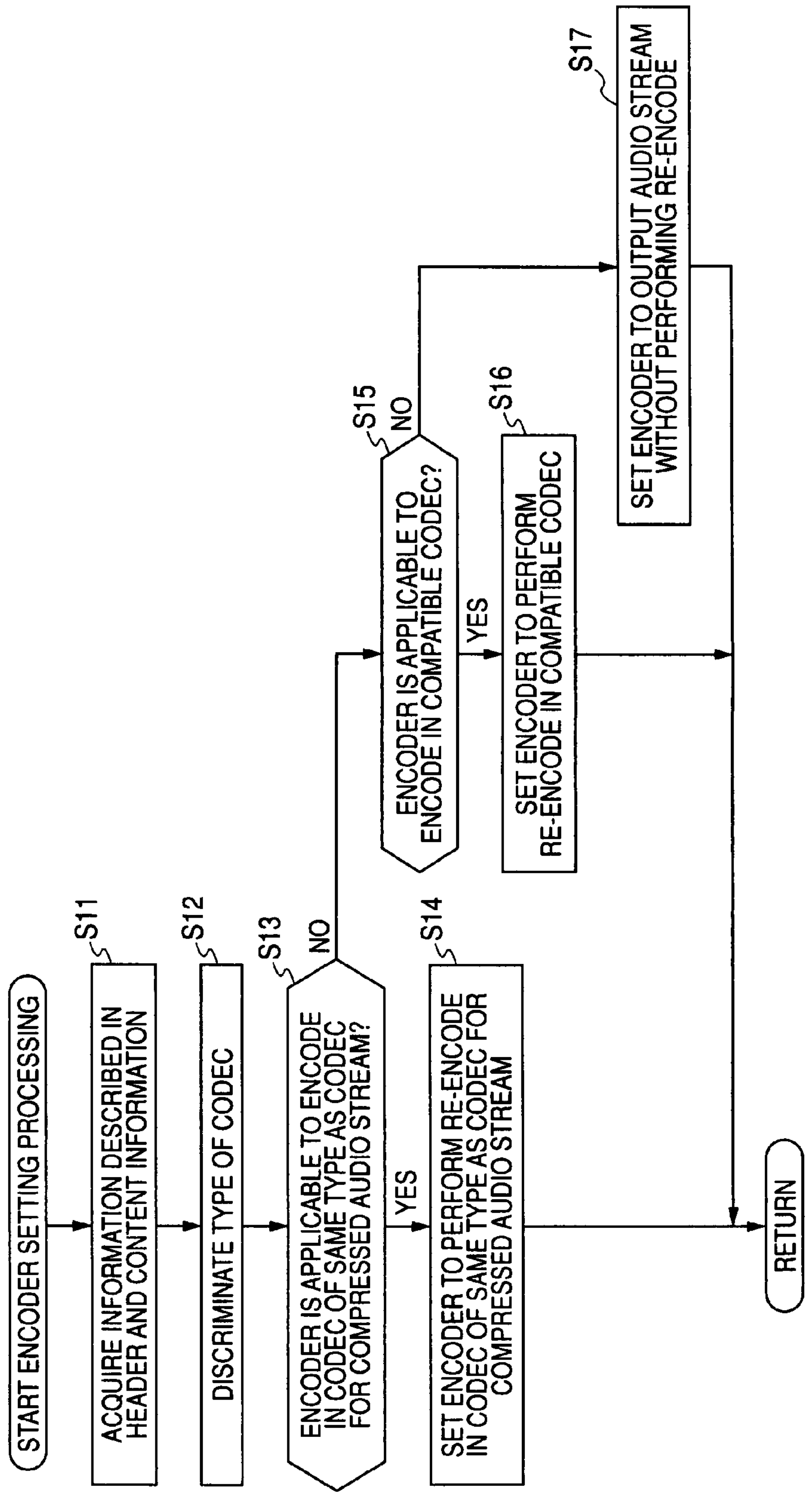
FIG. 5 is a flowchart for explaining encoder setting processing performed in step S3 in FIG. 4.

These states are equivalent to the case that the processing in step S14 in FIG. 5 is performed when the encoder 33 is set such that re-encode is performed using the codec of the type same as that of the codec used for the encode of the compressed audio stream recorded on the optical disk 11.

On the other hand, when a compressed audio stream encoded by the codec of Dolby digital plus or Dolby lossless is read out from the optical disk 11 and subjected to the signal processing, an audio stream obtained by the signal processing is re-encoded by the codec of Dolby digital, which is a highly compatible codec, and outputted.

When a compressed audio stream encoded by the codec of DTS-HD is read out from the optical disk 11 and subjected to the signal processing, an audio stream obtained by the signal processing is re-encoded by the codec of DTS, which is a highly compatible codec, and outputted.

These states are equivalent to the case that the processing in step S16 in FIG. 5 is performed when the encoder 33 is set such that re-encode is performed using the codec used for the encode of the compressed audio stream recorded on the optical disk 11 and a highly compatible codec.

FIG. 6 is a block diagram showing another example of the structure of the audio-signal processing unit 13 in FIG. 2. Components same as those in FIG. 3 are denoted by the same reference numerals and signs. Redundant explanations are omitted as appropriate.

The structure shown in FIG. 6 is the same as the structure shown in FIG. 3 except that a connected-apparatus-information receiving unit 41 is further provided.

The decoder 31 decodes a compressed audio stream supplied from the readout control unit 12 and outputs an uncompressed audio stream obtained by decoding the compressed audio stream to the signal processing unit 32. The signal processing unit 32 applies signal processing to the uncompressed audio stream supplied from the decoder 31. The encoder 33 re-encodes the uncompressed audio stream supplied from the signal processing unit 32 in accordance with setting by the encoder setting unit 35. The stream-header analyzing/content-information acquiring unit 34 acquires information described in a header of the compressed audio stream supplied from the readout control unit 12 and content information.

The encoder setting unit 35 selects, on the basis of a result of discrimination of a codec according to the information supplied from the stream-header analyzing/content-information acquiring unit 34 and connected apparatus information supplied from the connected-apparatus-information receiving unit 41, a type and the like of a codec used for re-encode and sets the re-encode in the encoder 33. The connected apparatus information supplied from the connected-apparatus-information receiving unit 41 includes information representing a type of a codec, by which the eternal decoder 21 can decode.

For example, even when the encoder 33 is applicable to encode in a codec of a type same as that of a codec used for encode of a compressed audio stream recorded on the optical disk 11, when the external decoder 21 is not applicable to decode in the codec, the codec of the type same as that of the codec used for the encode of the compressed audio stream recorded on the optical disk 11 is not used for the re-encode. Only when the external decoder 21 is applicable to the decode, the codec of the type same as that of the codec used for the encode of the compressed audio stream recorded on the optical disk 11 is used for the re-encode.

It is judged on the basis of the connected apparatus information supplied from the connected-apparatus-information receiving unit 41 whether the external decoder 21 is applicable to the decode in the codec of the type same as that of the codec used for the encode of the compressed audio stream recorded on the optical disk 11.

The connected-apparatus-information receiving unit 41 communicates with the external decoder 21 of the external apparatus 2, which is connected thereto through an interface of the HDMI standard or the IEEE1394 standard, through the input/output I/F 14 and acquires the connected apparatus information. The connected-apparatus-information receiving unit 41 outputs the connected apparatus information acquired from the external decoder 21 to the encoder setting unit 35.

Processing by the player 1 having the structure shown in FIG. 6 is explained below.

Figure 7:
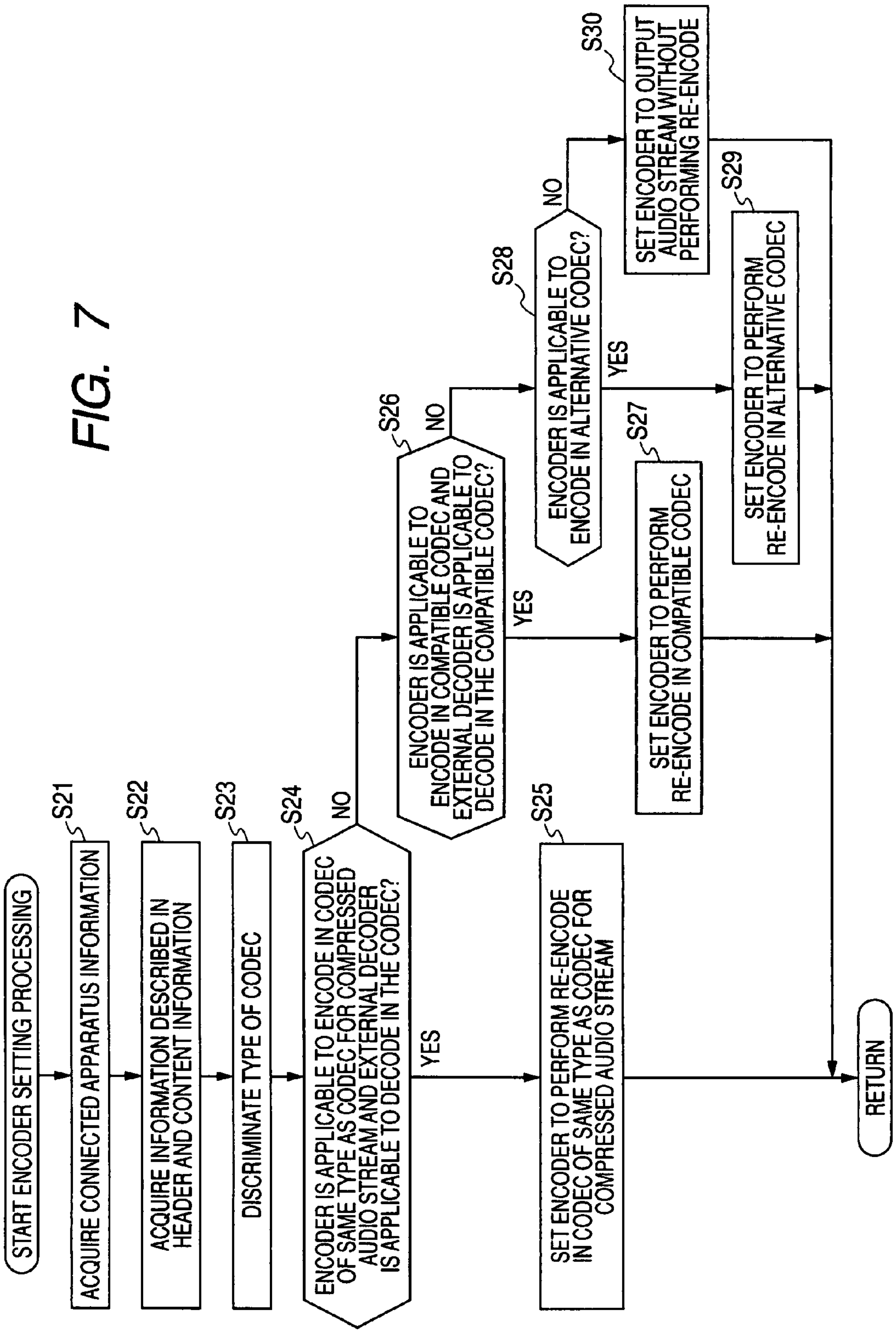
FIG. 7 is a flowchart for explaining other encoder setting processing performed in step S3 in FIG. 4.

Processing same as the processing explained with reference to FIG. 4 is performed by the player 1 having the structure shown in FIG. 6. Encoder setting processing performed by the player 1 having the structure shown in FIG. 6 in step S3 in FIG. 4 is explained below with reference to a flowchart in FIG. 7.

In step S21, the connected-apparatus-information receiving unit 41 acquires connected apparatus information from the external decoder 21 and outputs the acquired connected apparatus information to the encoder setting unit 35.

In step S22, the stream-header analyzing/content-information acquiring unit 34 acquires information described in a header of a compressed audio stream supplied from the readout control unit 12 and content information and outputs the acquired information to the encoder setting unit 35.

In step S23, the encoder setting unit 35 discriminates, on the basis of the information supplied from the stream-header analyzing/content-information acquiring unit 34, a type of a codec used for encode of the compressed audio stream recorded on the optical disk 11.

In step S24, the encoder setting unit 35 judges whether the encoder 33 is applicable to encode in a codec of a type same as that of the codec used for the encode of the compressed audio stream recorded on the optical disk 11 and the external decoder 21 is applicable to decode in the codec. When it is judged that the encode 33 is applicable to the encode and the external decoder 21 is applicable to the decode, the processing proceeds to step S25.

In step S25, the encoder setting unit 35 sets the encoder 33 such that re-encode is performed using the codec of the type same as that of the codec used for the encode of the compressed audio stream recorded on the optical disk 11. Thereafter, the processing returns to step S3 in FIG. 4 and re-encode of the audio stream is performed using the codec of the type same as that of the codec used for the encode of the compressed audio stream recorded on the optical disk 11.

On the other hand, when the encoder setting unit 35 judges in step S24 that the encoder 33 is not applicable to the encode in the codec of the type same as that of the codec used for the encode of the compressed audio stream recorded on the optical disk 11 or the external decoder 21 is not applicable to the decode in the codec of the type same as that of the codec used for the encode of the compressed audio stream recorded on the optical disk 11, the processing proceeds to step S26.

In step S26, the encoder setting unit 35 judges whether the encoder 33 is applicable to encode in a compatible codec, which is highly compatible with the codec used for the encode of the compressed audio stream recorded on the optical disk 11, and the external decoder 21 is applicable to decode in the compatible codec. When it is judged that the encoder 33 is applicable to the encode and the external decoder 21 is applicable to the decode, the processing proceeds to step S27.

In step S27, the encoder setting unit 35 sets the encoder 33 such that re-encode is performed in the compatible codec. Thereafter, the processing returns to step S3 in FIG. 4 and re-encode of the audio stream is performed using the compatible codec.

On the other hand, when the encoder setting unit 35 judges in step S26 that the encoder 33 is not applicable to the encode in the compatible codec or the external decoder 21 is not applicable to the decode in the compatible codec, the processing proceeds to step S28.

In step S28, the encoder setting unit 35 judges whether the encoder 33 is applicable to encode in an alternative codec.

The alternative codec is a codec, which the external decoder 21 uses for decode, and is represented by connected apparatus information.

When the encoder setting unit 35 judges in step S28 that the encoder 33 is applicable to the encode in the alternative codec, the processing proceeds to step S29. The encoder setting unit 35 sets the encoder 33 such that re-encode is performed in the alternative codec. Thereafter, the processing returns to step S3 in FIG. 4. A codec used for re-encode is set to the codec, which is used by the external decoder 21 for decode. Re-encode of the audio stream is performed using the alternative codec.

On the other hand, when the encoder setting unit 35 judges in step S28 that the encoder 33 is neither applicable to the encode in the alternative codec, the processing proceeds to step S30. The encoder setting unit 35 sets the encoder 33 such that an audio stream is outputted without being re-encoded. Thereafter, an audio stream of linear PCM or the like obtained by performing signal processing is outputted to the external decoder 21 while kept in an uncompressed state. In this case, the processing in step S4 in FIG. 4 for re-encoding the audio stream is not performed and the processing in FIG. 4 is finished.

As described above, the codec of the type same as that of the codec, which is used by the external decoder 21 for decode is used for re-encode on the basis of the connected apparatus information acquired from the external decoder 21. This makes it possible to surely prevent a situation in which the external decoder 21 cannot decode the re-encoded compressed audio stream.

In the above explanation, the setting of a type of a codec used for re-encoding is mainly explained. However, the setting of encode parameters used for the re-encode can be performed as described below.

For example, when the re-encode is performed in accordance with parameters as close as possible to the encode parameters used in the encode of the compressed audio stream, an audio stream closer to the compressed audio stream before decode can be reproduced by the re-encode. Thus, it is desirable to set values, all of which are the same as values of the encode parameters used in the encode of the compressed audio stream, as parameters to which the encoder 33 is applicable. For example, when speaker structure information, information indicating a down-mix type and a down-mix coefficient, and the like are acquired as encode parameters besides the number of channels and the sampling rate as described above, values same as the values of the encode parameters acquired from the information described in the header are set as values of those parameters used in the re-encode.

As a bit rate, a rate equivalent to a bit rate set in the encode parameters used in the encode of the compressed audio stream before decode may be set in the re-encode as well. However, to control deterioration in an audio quality due to the re-encode as much as possible, it is desirable that a maximum bit rate allowed in a range of standards of the codec used for the re-encode and an interface between the player 1 and the external apparatus 2 is set to perform the re-encode.

Consequently, it is possible to prevent audio outputted by the external decoder 21 from becoming different when the compressed audio stream read out from the optical disk 11 is directly outputted without being subjected to the signal processing and when the compressed audio stream is subjected to the signal processing, re-encoded, and outputted.

The re-encode of the audio stream read out from the optical disk 11 is explained above. However, an audio stream of contents broadcasted by a digital broadcast and an audio stream of contents delivered via a network can also be re-encoded in the same manner and outputted from the player 1.

The external apparatus 2 may be any apparatus as long as the external decoder 21 is provided therein. The external apparatus 2 is not limited to the AV amplifier and may be apparatuses such as a TV.

In the above explanation, the audio stream is subjected to the signal processing, re-encoded, and outputted. However, when it is necessary to once decode a video stream and apply the signal processing to the video stream, as in the case of the audio stream described above, re-encode in output of the video stream may be performed using a codec of a type same as a codec used for encode of a video stream recorded on the optical disk 11.

It is possible to perform the series of processings described above using hardware or software. In performing the series of processings using the software, a computer program forming the hardware is installed in a computer built in dedicated hardware or, for example, a general-purpose computer, which is capable of executing various functions by installing various programs, from a program recording medium.

Figure 8:
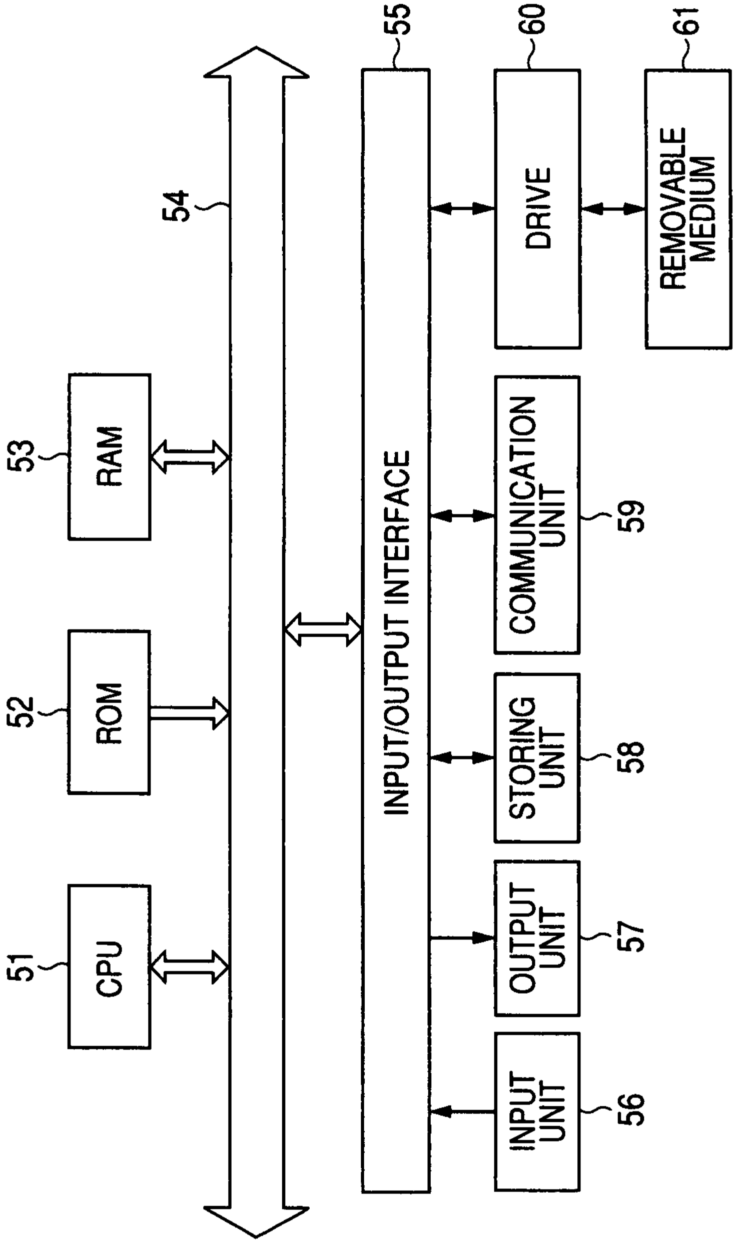
FIG. 8 is a block diagram showing an example of a structure of a personal computer.

FIG. 8 is a block diagram showing an example of a structure of a personal computer that executes the series of processings using a computer program.

A CPU (Central Processing Unit) 51 executes various kinds of processings in accordance with a program stored in a ROM (Read Only Memory) 52 or a storing unit 58. A program executed by the CPU 51, data, and the like are stored in a RAM (Random Access Memory) 53 as appropriate. The CPU 51, the ROM 52, and the RAM 53 are connected to one another by a bus 54.

An input/output interface 55 is also connected to the CPU 51 via the bus 54. An input unit 56 including a keyboard, a mouse, and a microphone and an output unit 57 including a display and a speaker are connected to the input/output interface 55. The CPU 51 executes various kinds of processings according to a command inputted from the input unit 56. The CPU 51 outputs a result of the processing to the output unit 57.

The storing unit 58 connected to the input/output interface 55 includes a hard disk and stores the program executed by the CPU 51 and various data. A communication unit 59 communicates with an external apparatus via networks such as the Internet and a local area network.

A drive 60 connected to the input/output interface 55 drives a removable medium 61 such as a magnetic disk, an optical disk, a magneto-optical disk, or a semiconductor memory when the removable medium 61 is inserted therein and acquires the program, data, and the like recorded on the removable medium 61. The acquired program and data are transferred to the storing unit 58 when necessary and stored.

The program recording medium that stores a program installed in the computer and executable by the computer includes, as shown in FIG. 8, the removable medium 61 as a package medium including a magnetic disk (including a flexible disk), an optical disk (including a CD-ROM (Compact Disc-Read Only Memory) and a DVD (Digital Versatile Disc)), a magneto-optical disk, or a semiconductor memory, the ROM 52 in which the program is temporarily or permanently stored, or the hard disk constituting the storing unit 58. The storage of the program in the program recording medium is performed using a wire or wireless communication medium such as a local area network, the Internet, or a digital satellite broadcast via the communication unit 59 serving as an interface such as a router or a modem when necessary.

In this specification, the steps describing the computer program include not only processing executed in time series according to a described order but also processing not always executed in time series but executed in parallel or individually.

In this specification, the system represents an entire apparatus including plural apparatuses.

Embodiments of the present invention are not limited to the embodiment described above. Various modifications of the embodiments are possible without departing from the spirit of the present invention.

It should be understood by those skilled in the art that various modifications, combinations, sub-combinations, and alterations may occur depending on design requirements and other factors insofar as they are within the scope of the appended claims or the equivalents thereof.

The invention claimed is:

1. A signal processing apparatus comprising a processor for implementing:

a decoder that receives a compressed audio stream encoded by a predetermined codec and decodes the compressed audio stream;

a signal processing unit that applies predetermined signal processing to an audio stream obtained by decoding the compressed audio stream with the decoder;

a first acquisition unit that acquires at least one of information described in a header of the compressed audio stream and management information for contents including the compressed audio stream;

a second acquisition unit that acquires information concerning an external apparatus that has a decoder;

a setting unit that discriminates, on the basis of the information acquired by the first acquisition unit, a type of the codec used for the encoding of the compressed audio stream and sets a codec used for encoding of the audio stream subjected to the signal processing by the signal processing unit based on the information acquired by the first acquisition unit and the information acquired by the second acquisition unit; and an encoder that encodes, in accordance with the setting by the setting unit, the audio stream subjected to the signal processing by the signal processing unit and outputs the audio stream to the external apparatus, wherein when the encoder is applicable to encode in a given codec that is one of (i) the same type as the codec used for the encoding of the compressed audio stream, (ii) compatible with the codec used for the encoding of the compressed audio stream, and (iii) alternative to the codec used for the encoding of the compressed audio stream, and the decoder of the external apparatus is applicable to decode in the given codec, the encoder encodes the audio stream subjected to the signal processing using the given codec, and when the encoder is not applicable to encode in a given codec that is any of (i) the same type as the codec used for the encoding of the compressed audio stream, (ii) compatible with the codec used for the encoding of the compressed audio stream, and (iii) alternative to the codec used for the encoding of the compressed audio stream, the encoder does not encode the audio stream subjected to the signal processing.

2. A signal processing apparatus according to claim 1, wherein the signal processing unit applies signal processing for changing an audio stream to a stream, in which audio combined with other audio is outputted, to the audio stream obtained by decoding the compressed audio stream with the decoder.

3. A signal processing apparatus according to claim 1, wherein the codec set by the setting unit is a higher-order codec obtained by extending a function of the codec used for the encode of the compressed audio stream or a lower-order codec obtained by reducing the function.

4. A signal processing apparatus according to claim 1, wherein the first acquisition unit further acquires parameters used for the encode of the compressed audio stream, and the setting unit sets the encoder such that the encode of the audio stream subjected to the signal processing by the signal processing unit is performed in accordance with parameters same as the parameters acquired by the first acquisition unit.

5. A signal processing method comprising:

decoding a compressed audio stream encoded by a predetermined codec;

applying predetermined signal processing to an audio stream obtained by decoding the compressed audio stream;

acquiring first information including at least one of information described in a header of the compressed audio stream and management information for contents including the compressed audio stream;

acquiring second information concerning an external apparatus that has a decoder;

discriminating, on the basis of the acquired information, a type of the codec used for the encoding of the compressed audio stream and setting a codec used for encoding of the audio stream subjected to the signal processing based on the first information and the second information; and encoding by use of an encoder, in accordance with the setting, the audio stream subjected to the signal processing and outputting the audio stream to the external apparatus, wherein when the encoder is applicable to encode in a given codec that is one of (i) the same type as the codec used for the encoding of the compressed audio stream, (ii) compatible with the codec used for the encoding of the compressed audio stream, and (iii) alternative to the codec used for the encoding of the compressed audio stream, and the decoder of the external apparatus is applicable to decode in the given codec, the encoder encodes the audio stream subjected to the signal processing using the given codec, and when the encoder is not applicable to encode in a given codec that is any of (i) the same type as the codec used for the encoding of the compressed audio stream, (ii) compatible with the codec used for the encoding of the compressed audio stream, and (iii) alternative to the codec used for the encoding of the compressed audio stream, the encoder does not encode the audio stream subjected to the signal processing.

6. A non-transitory recording medium having stored thereon a computer program for causing a computer to execute processing including:

decoding a compressed audio stream encoded by a predetermined codec;

applying predetermined signal processing to an audio stream obtained by decoding the compressed audio stream;

acquiring first information including at least one of information described in a header of the compressed audio stream and management information for contents including the compressed audio stream;

acquiring second information concerning an external apparatus that has a decoder;

discriminating, on the basis of the acquired information, a type of the codec used for the encoding of the compressed audio stream and setting a codec used for encoding of the audio stream subjected to the signal processing based on the first information and the second information; and encoding by use of an encoder, in accordance with the setting, the audio stream subjected to the signal processing and outputting the audio stream to the external apparatus, wherein when the encoder is applicable to encode in a given codec that is one of (i) the same type as the codec used for the encoding of the compressed audio stream, (ii) compatible with the codec used for the encoding of the compressed audio stream, and (iii) alternative to the codec used for the encoding of the compressed audio stream, and the decoder of the external apparatus is applicable to decode in the given codec, the encoder encodes the audio stream subjected to the signal processing using the given codec, and when the encoder is not applicable to encode in a given codec that is any of (i) the same type as the codec used for the encoding of the compressed audio stream, (ii) compatible with the codec used for the encoding of the compressed audio stream, and (iii) alternative to the codec used for the encoding of the compressed audio stream, the encoder does not encode the audio stream subjected to the signal processing.

* * * * *